US009442560B2

(12) United States Patent
Asami et al.

(10) Patent No.: US 9,442,560 B2
(45) Date of Patent: Sep. 13, 2016

(54) MEMORY SYSTEM MINIMIZING OCCURRENCES OF STORING OF OPERATION DATA IN NON-VOLATILE STORAGE DURING POWER SAVING MODE

(71) Applicant: Kabushiki Kaisha Toshiba, Minato-ku (JP)

(72) Inventors: Shohei Asami, Yokohama (JP); Toshikatsu Hida, Yokohama (JP); Mitsunori Tadokoro, Fujisawa (JP); Hirokazu Morita, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 154 days.

(21) Appl. No.: 14/302,835

(22) Filed: Jun. 12, 2014

(65) Prior Publication Data
US 2015/0241952 A1 Aug. 27, 2015

Related U.S. Application Data

(60) Provisional application No. 61/944,867, filed on Feb. 26, 2014.

(51) Int. Cl.
*G06F 1/32* (2006.01)

(52) U.S. Cl.
CPC ........... *G06F 1/3287* (2013.01); *G06F 1/3268* (2013.01); *G06F 1/3275* (2013.01); *G06F 1/3293* (2013.01)

(58) Field of Classification Search
CPC .... G06F 1/3268; G06F 1/325; G06F 1/3225; G06G 1/3275
See application file for complete search history.

(56) References Cited

U.S. PATENT DOCUMENTS 5,414,861 A    5/1995  Horning
8,438,348 B2   5/2013  Hosaka
2006/0171231 A1* 8/2006 Song ................. G11C 5/147
                                                365/226
2009/0024843 A1* 1/2009 Choi .................. G06F 9/4401
                                                713/2
2009/0172439 A1* 7/2009 Cooper ............... G06F 1/3203
                                                713/323
2010/0169687 A1* 7/2010 Kimura .............. G06F 1/3221
                                                713/324
2011/0078463 A1* 3/2011 Fleming ............. G06F 1/3203
                                                713/300
2012/0079171 A1* 3/2012 Ju et al. ............ G06F 12/0246
                                                711/103
2012/0159060 A1   6/2012  Yu et al.
2014/0040650 A1   2/2014  Hida et al.
2014/0281599 A1* 9/2014  Grimsrud ............ G06F 1/3287
                                                713/320
2015/0178009 A1* 6/2015  Shin ................. G06F 3/0625
                                                711/103

FOREIGN PATENT DOCUMENTS

JP    11-184569     7/1999
JP    2009-237602  10/2009

OTHER PUBLICATIONS

U.S. Appl. No. 14/796,330, filed Jul. 10, 2015, Anazawa, et al.

* cited by examiner

*Primary Examiner* — Thomas Lee
*Assistant Examiner* — Santosh R Poudel
(74) *Attorney, Agent, or Firm* — Oblon, McClelland, Maier & Neustadt, L.L.P.

(57) ABSTRACT

According to one embodiment, a memory system includes a non-volatile first storage unit, a second storage unit, a third storage unit, and a controller. The controller is configured to selectively execute, following transition to a first mode, either a procedure of writing data of the second storage unit in the third storage unit, or a procedure of writing data of the third storage unit in the first storage unit while reducing power feed to the first and third storage units.

20 Claims, 14 Drawing Sheets

FIG.2

|  |  | OPERATION INFORMATION | OPERATION INFORMATION SAVING MEMORY | NON-VOLATILE MEMORY | CONTROLLER |
|---|---|---|---|---|---|
| NORMAL MODE | | STORE IN WORKING MEMORY | POWER SUPPLY IS TURNED ON | POWER SUPPLY IS TURNED ON | POWER SUPPLY IS TURNED ON |
| LOW POWER CONSUMPTION MODE | FIRST STATE | SAVE IN OPERATION INFORMATION SAVING MEMORY | POWER SUPPLY IS TURNED ON | POWER SUPPLY IS TURNED ON | MOST POWER SUPPLY IS CUT OFF |
| | SECOND STATE | STORE IN NON-VOLATILE MEMORY | POWER SUPPLY IS CUT OFF | POWER SUPPLY IS CUT OFF | MOST POWER SUPPLY IS CUT OFF |

MEMORY SYSTEM MINIMIZING OCCURRENCES OF STORING OF OPERATION DATA IN NON-VOLATILE STORAGE DURING POWER SAVING MODE

CROSS-REFERENCE TO RELATED APPLICATIONS

This application is based upon and claims the benefit of priority from U.S. Provisional Application No. 61/944,867, filed on Feb. 26, 2014; the entire contents of which are incorporated herein by reference.

FIELD

Embodiments described herein relate generally to a memory system.

BACKGROUND

In a mobile-type personal computer, a built-in semiconductor storage device with lower power consumption has been sought. For this purpose, a function to enter a low power consumption mode is provided to allow transition when there is no access from a host (i.e., at the time of idling) or when a request for transition to the low power consumption mode is issued from the host. In general, transition to a low power consumption mode accompanies a procedure of saving management information and operation information necessary for return in a non-volatile memory before turning off a power supply of a controller and a volatile memory. In a particular condition of use, however, a request for transition to the low power consumption mode may be issued from a host very frequently. In this case, if the management information and the operation information necessary for return are written in the non-volatile memory every time the request is issued, the number of times of writing to the non-volatile memory is increased. Accordingly, the non-volatile memory would be exhausted, leading to a failure of securing reliability of the non-volatile memory. Meanwhile, by writing the management information and the operation information necessary for return in the volatile memory to ensure reliability of the non-volatile memory, cancellation of a conduction of the volatile memory would be prohibited, to thereby minimize an effect of reducing power consumption.

BRIEF DESCRIPTION OF THE DRAWINGS

FIG. 2 is a schematic diagram illustrating a power feed state of the memory system according to the first embodiment;

DETAILED DESCRIPTION

In general, according to one embodiment, a memory system includes a non-volatile first storage unit, a second storage unit, a third storage unit, and a controller. The controller is configured to selectively execute, following transition to a first mode, either a procedure of writing data of the second storage unit in the third storage unit, or a procedure of writing data of the third storage unit in the first storage unit while reducing power feed to the first and third storage units.

In the following, memory systems according to embodiments will be described in detail with reference to the accompanying drawings. It is noted that the present invention is not limited by the description of embodiments below.

First Embodiment

Figure 1:
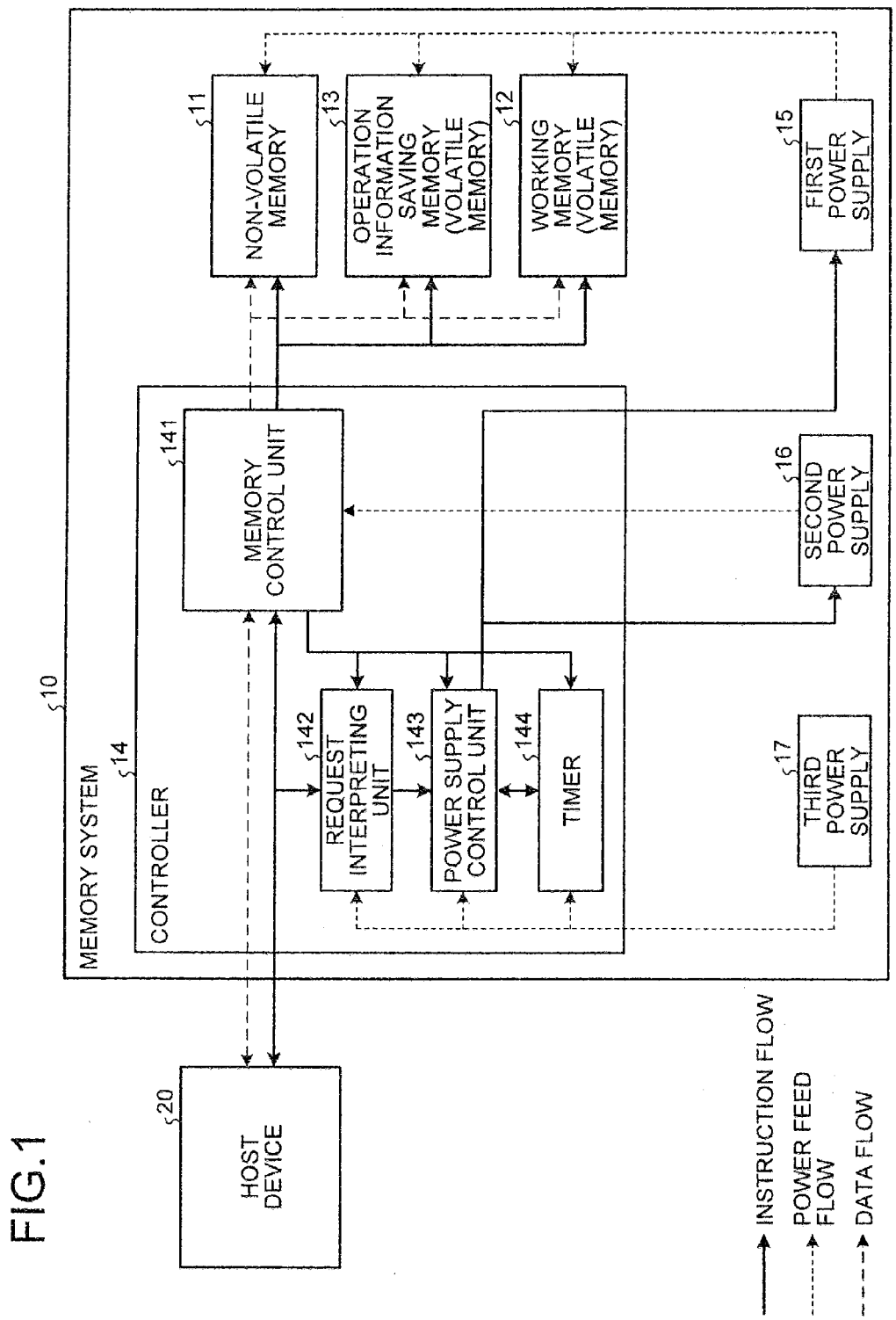
FIG. 1 is a schematic block diagram illustrating the structure of a memory system according to a first embodiment.

FIG. 1 is a schematic block diagram illustrating the structure of a memory system according to a first embodiment. Constituent elements of the structure necessary for explaining the embodiment are illustrated in the drawing. Also, an instruction flow is indicated by a solid line, a power feed flow is indicated by a dotted line, and a data flow is indicated by a broken line in the drawing.

A memory system 10 is electrically connected to a host device via an interface, such as a serial advanced technology attachment (SATA), a peripheral component interconnect express (PCIe), a serial attached small computer system interface (SAS), or a universal serial bus (USB). The memory system 10 functions as a storage device of a host device 20. The memory system 10 receives a data access control request such as a write request, a read request, or an erase request from the host device 20. Upon receiving such a data access control request, the memory system 10 executes data access processing. An example of the memory system 10 is a solid state drive (SSD), but the memory system 10 is not limited thereto.

The memory system 10 includes a non-volatile memory 11 as a first storage unit, a working memory 12 as a second storage unit, an operation information saving memory 13 as a third storage unit, a controller 14, a first power supply 15, a second power supply 16, and a third power supply 17.

The non-volatile memory 11 is a storage medium capable of storing information in a non-volatile manner, with the number of times of use for storage being limited. Such a non-volatile memory 11 may be realized by, for example, a NAND-type flash memory (hereinafter referred to as a NAND memory). The non-volatile memory 11 stores user data and also stores management information for use in managing the memory system 10 and operation information necessary for return (hereinafter merely referred to as operation information).

The working memory 12 stores operation information used by the controller 14. The operation information may be, for example, snapshot and logs. Snapshot is, for example, data storage position management information stored at predetermined timing. The data storage position management information is used to manage an address designated by the host device 20 and a data storage position in the non-volatile memory 11. Logs are stored as differences between data storage position management information after data contents are changed by storage of data and the snapshot. Alternatively, logs are stored as differences between a combination of the snapshot and previously acquired logs and the data storage position management information after data contents are changed by storage of data. The working memory 12 is formed by a volatile memory. Information stored in the working memory 12 is stored before the memory system 10 (the working memory 12) is turned off. Such a working memory 12 is, for example, a dynamic random access memory (DRAM) or a static RAM (SRAM).

The operation information saving memory 13 temporarily stores the operation information stored in the working memory 12 when a condition of transition to a low power consumption mode is satisfied. The operation information saving memory 13 is, for example, a volatile memory such as a DRAM or an SRAM. As will be described below, the operation information stored in the operation information saving memory 13 may be stored in the non-volatile memory 11 or returned to the working memory 12 depending on a succeeding state of the memory system 10.

The controller 14 executes processing in the memory system 10 according to an instruction from the host device 20. In the first embodiment, two stages of state are set in low power consumption mode to allow the controller 14 to execute state changing processing between the two stages of low power consumption mode and a normal state (hereinafter referred to as normal mode) by an instruction from the host device 20 or according to the state of the memory system 10. It is assumed herein that the low power consumption mode includes a first state and a second state. In the first state, the operation information is saved in the operation information saving memory 13, and most of the power supply of the controller 14 is cut off while keeping the conduction state between the non-volatile memory 11 and the operation information saving memory 13. In the second state, the operation information is saved in the non-volatile memory 11, and most of the power supply of the controller 14 and the power supplies of the non-volatile memory 11 and the operation information saving memory 13 are cut off. FIG. 2 is a schematic diagram illustrating a power feed state of the memory system according to the first embodiment.

The controller 14 is configured to execute such a switchover of the power supply and includes a memory control unit 141, a request interpreting unit 142, a power supply control unit 143, and a timer 144.

The memory control unit 141 is configured to control a data flow and an overall behavior of the memory system 10. In this case, when a state transition condition between the normal mode and the first and second states of the low power consumption mode is satisfied, the power supply control unit 143 receives an instruction to switch the on-off state of the first and second power supplies 15 and 16. Simultaneously, the operation information having been stored in the working memory 12 during the normal mode is saved in the operation information saving memory 13, stored in the non-volatile memory 11, or restored in the working memory 12.

Specifically, when the condition of transition to the low power consumption mode is satisfied in the normal mode, transition to the first state is executed as follows. The operation information in the working memory 12 is saved in the operation information saving memory 13, the timer 144 is requested to start, the request interpreting unit 142 is requested to monitor a request for return from the low power consumption mode, and the power supply control unit 143 is requested to cut off the second power supply 16. Examples of the condition of transition to the low power consumption mode may include a state where the idle state having no access from the host has started, or a state where the request for transition to the low power consumption mode from the host device 20 has been issued.

Meanwhile, when the condition of transition to the second state is satisfied in the first state, the transition to the second state is executed as follows. The second power supply 16 is started, the operation information in the operation information saving memory 13 is saved in the non-volatile memory 11, the request interpreting unit 142 is requested to monitor a request for return from the low power consumption mode, and the power supply control unit 143 is requested to cut off the first and second power supplies 15 and 16 (that is, to decrease power feed from the first and second power supplies 15 and 16 to the non-volatile memory 11 and the operation information saving memory 13). An example of the condition of transition to the second state may be a state where a predetermined time has passed since the transition to the first state.

When the condition of transition to the normal mode is satisfied in the first state, the operation information is read from the operation information saving memory 13 to the working memory 12, and return processing is executed. An example of the condition of transition to the normal mode may be a state where a request for return to the normal mode has been issued from the host device 20.

When the condition of transition to the normal mode is satisfied in the second state, the operation information is read from the non-volatile memory 11 to the working memory 12, and return processing is executed. An example of the condition of transition to the normal mode may be a state where a request for return to the normal mode has been issued from the host device 20.

The request interpreting unit 142 interprets the request sent from the host device 20 via an interface. When the request for transition to the low power consumption mode or the request for return to the normal mode (a request for cancellation of the low power consumption mode) is received, a notification is sent to the memory control unit 141 and the power supply control unit 143.

The power supply control unit 143 controls cutoff or startup (on-off) of the first power supply 15 or the second power supply 16 depending on the transition state. When the second power supply 16 is turned on, the on-off switching of the first and second power supplies 15 and 16 is executed in response to a request from the memory control unit 141.

When the second power supply 16 is turned off, the on-off switching of the first and second power supplies 15 and 16 is executed in response to a request from the request interpreting unit 142 or according to a monitor result of the timer 144.

Specifically, when the condition of transition to the low power consumption mode is satisfied in the normal mode, and the cutoff request of the second power supply 16 from the memory control unit 141 is received, the power feed from the second power supply 16 to the memory control unit 141 is cut off.

When the condition of transition to the second state of the low power consumption mode is satisfied in the first state, the second power supply 16 is turned on to store the operation information of the operation information saving memory 13 in the non-volatile memory 11 by the memory control unit 141. The cutoff requests of the first and second power supplies 15 and 16 are then received from the memory control unit 141 after the operation information is stored. Accordingly, the power feed from the first power supply 15 to the non-volatile memory 11 and the operation information saving memory 13 and the power feed from the second power supply 16 to the memory control unit 141 are cut off.

Further, when the condition of transition to the normal mode is satisfied in the first state of the low power consumption mode, and the return request is received from the request interpreting unit 142, the second power supply 16 is turned on.

When the condition of transition to the normal mode is satisfied in the second state of the low power consumption mode, and the return request is received from the request interpreting unit 142, the first and second power supplies 15 and 16 are turned on.

The timer 144 starts measuring a predetermined time upon receipt of a time measurement request from the memory control unit 141. In the first embodiment, time measurement is started when the condition of transition to the low power consumption mode is satisfied. The time measurement is executed, after the transition to the first state, to determine whether to enter the second state when no return request has been received for the predetermined time. For this purpose, an average time taken to receive the return request between the transition to the first state and the transition to the second state is previously measured, and a value larger than the average time is set as the predetermined time.

The first power supply 15 supplies power to the non-volatile memory 11 and the operation information saving memory 13. In the normal state and the first state of the low power consumption mode, the first power supply 15 feeds power to the non-volatile memory 11 and the operation information saving memory 13. In the second state of the low power consumption mode, however, the first power supply 15 cuts off power feed to the non-volatile memory 11 and the operation information saving memory 13. The on-off switching of the first power supply 15 is executed by the power supply control unit 143. The first power supply 15 switches on and off of the power feed to the working memory 12, but another power supply may be used to feed power to the working memory 12.

The second power supply 16 feeds power to the memory control unit 141 in the controller 14. In the normal state, power is fed to the memory control unit 141, but the power feed to the memory control unit 141 is cut off in (the first and second states of) the low power consumption mode. The on-off switching of the second power supply 16 is executed by the memory control unit 141 and the power supply control unit 143.

The third power supply 17 feeds power to processing units in the controller 14 other than the memory control unit 141. The third power supply 17 feeds power to the request interpreting unit 142, the power supply control unit 143, and the timer 144. The third power supply 17 feeds power to the request interpreting unit 142, the power supply control unit 143, and the timer 144 in the normal state and in the low power consumption mode as well.

Next, processing of power supply control in the memory system 10 having the above structure will be described. In the following, the entire operation of the memory system 10 is described, followed by the operations at each processing portion.

Figure 3:
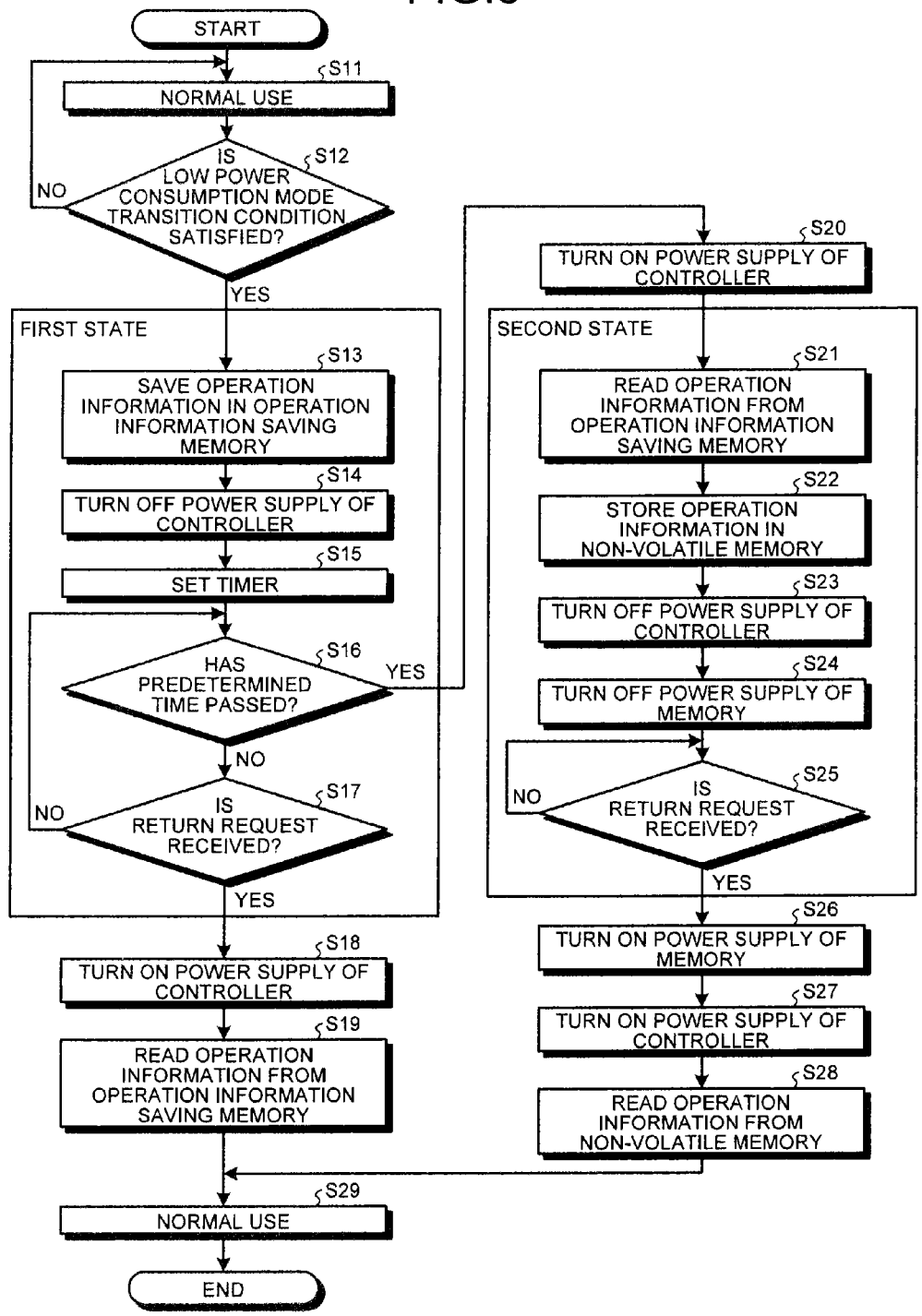
FIG. 3 is a flowchart illustrating an example of a processing procedure of power supply control of the memory system according to the first embodiment.

FIG. 3 is a flowchart illustrating an example of a processing procedure of power supply control in the memory system according to the first embodiment. It is assumed herein that the first to third power supplies 15 to 17 are used in the normal mode where all power supplies are turned on (step S11). In this state, it is determined whether the low power consumption mode transition condition is satisfied (step S12). Examples of the condition of transition to the low power consumption mode may include a state where the idle state has started in the memory system 10, or a state where the request for transition to the low power consumption mode from the host device 20 has been issued.

When the low power consumption mode transition condition is not satisfied (No at step S12), the process returns to step S11 and the use in the normal mode is started.

Meanwhile, when the low power consumption mode transition condition is satisfied (Yes at step S12), the operation enters the first state of the low power consumption mode. In the transition processing to the first state, the operation information stored in the working memory 12 is saved in the operation information saving memory 13 (step S13), and the power feed from the second power supply 16 to the controller 14 is cut off (step S14). In addition, the timer 144 is set (step S15), and the time measurement for a predetermined time is started.

After that, it is determined whether a predetermined time has passed (step S16). If the predetermined time has not passed (No at step S16), it is determined whether a return request is received from the host device 20 (step S17). If no return request has been received (No at step S17), the process returns to step S16.

In contrast, if the return request has been received from the host device 20 (Yes at step S17), cancellation processing of the low power consumption mode is executed. Specifically, the power feed from the second power supply 16 to the controller 14 is turned on (step S18), and the operation information having been saved temporarily in the operation information saving memory 13 is read to the working memory 12 (step S19). Accordingly, the use in the normal mode is executed (step S29), and the processing is ended.

When the predetermined time has passed in step S16 (Yes at step S16), that is, when the predetermined time has passed before the return request is received from the host device 20, the power feed from the second power supply 16 to the controller 14 is turned on (step S20). The second state of the low power consumption mode is thus entered. The power feed to the controller 14 aims to execute information storing processing of the operation information from the operation information saving memory 13 to the non-volatile memory 11 before entering the second state.

The operation information is read from the operation information saving memory 13 (step S21), and the read operation information is saved in the non-volatile memory 11 (step S22). After that, the power feed from the second power supply 16 to the controller 14 is turned off (step S23), and the power feed from the first power supply 15 to the non-volatile memory 11 and the operation information saving memory 13 is also turned off (step S24).

Subsequently, it is determined whether the return request has been received from the host device 20 (step S25). If no return request has been received (No at step S25), the process enters a wait state until the return request is received (step S25).

Meanwhile, if the return request is received (Yes at step S25), the cancellation processing of the low power consumption mode is executed. Specifically, the power feed from the first power supply 15 to the non-volatile memory 11 and the operation information saving memory 13 is turned on (step S26), the power feed from the second power supply 16 to the controller 14 is turned on (step S27), and the latest operation information saved in the non-volatile memory 11 is read to the working memory 12 (step S28). Accordingly, the use in the normal mode is executed (step S29), and the processing is ended.

Next, operations at each processing portion will be described in detail. Such operations include transition processing from the normal mode to the first state of the low power consumption mode, processing in the first state, transition processing from the first state to the normal mode, transition processing from the first state to the second state, processing in the second state, and transition processing from the second state to the normal mode.

<Transition Processing from the Normal Mode to the First State of the Low Power Consumption Mode>

Figure 4:
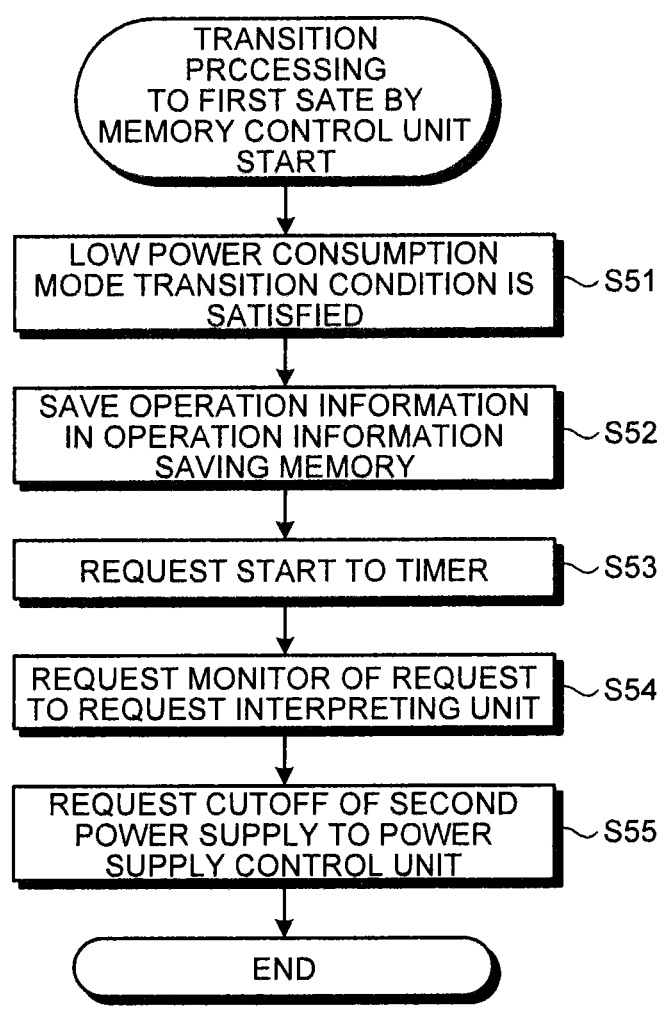
FIG. 4 is a flowchart illustrating an example of a procedure of a memory control unit in transition processing from a normal mode to a first state of a low power consumption mode.

FIG. 4 is a flowchart illustrating an example of a procedure of the memory control unit in transition processing from the normal mode to the first state of the low power consumption mode. First, when the predetermined low power consumption mode transition condition is satisfied (step S51), the memory control unit 141 temporarily saves, in the operation information saving memory 13, the operation information including the management information necessary for the operation of the memory system 10 and the return information necessary for return (step S52). After that, the memory control unit 141 issues a request to start counting to the timer 144 (step S53), a request to monitor the request from the host device 20 to the request interpreting unit 142 (step S54), and a cutoff request to the power supply control unit 143 to turn off the second power supply 16 (step S55). Accordingly, the transition processing to the first state by the memory control unit 141 is ended.

<Processing in the First State>

Figure 5:
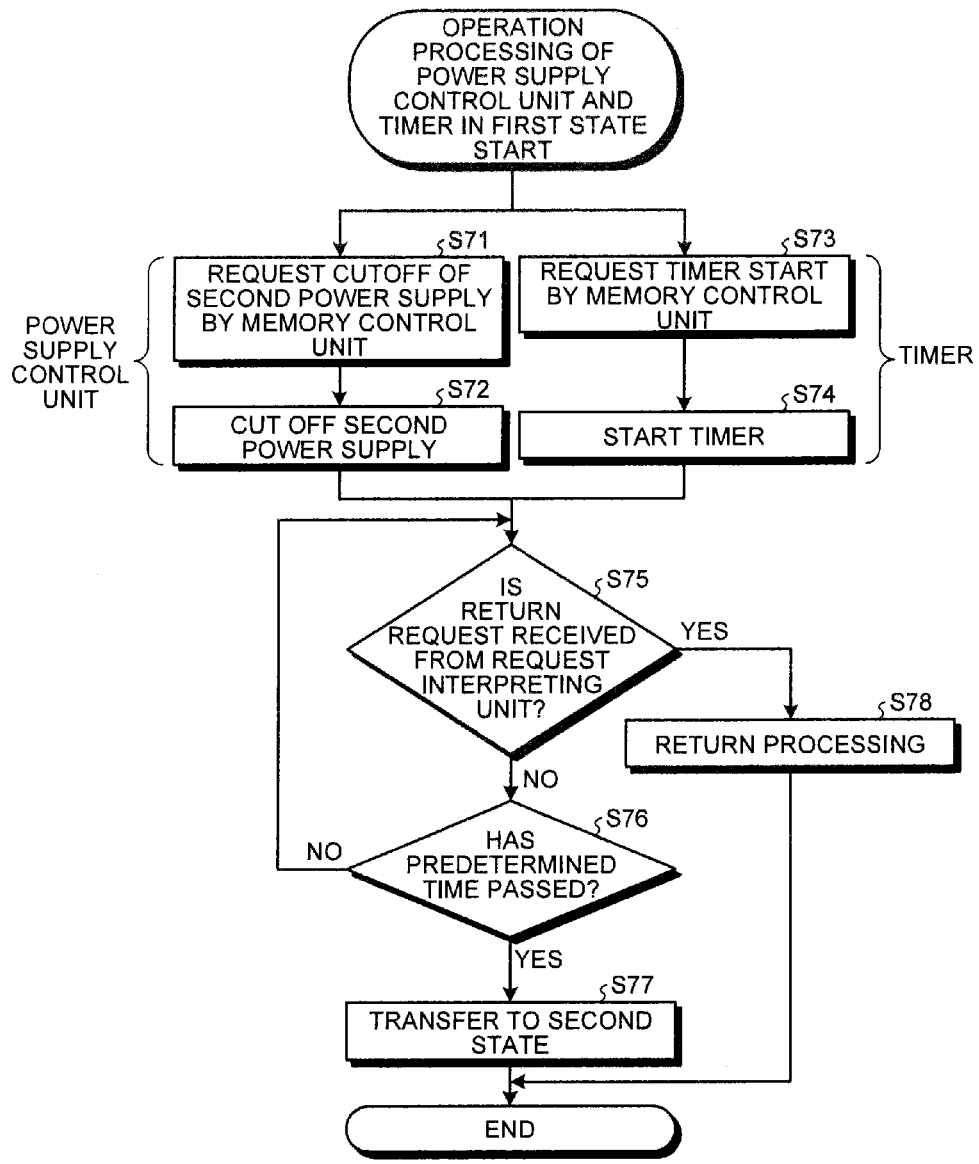
FIG. 5 is a flowchart illustrating an example of a processing procedure of a power supply control unit and a timer in the first state.

FIG. 5 is a flowchart illustrating an example of a processing procedure in the first state of the power supply control unit and the timer. When the request to cut off the second power supply 16 is received from the memory control unit 141 in step S55 of FIG. 4 (step S71), the power supply control unit 143 follows the request to cut off the power feed to the memory control unit 141 (step S72).

Meanwhile, in parallel with executing the processing in the power supply control unit 143, the timer 144 receives the request to start counting from the memory control unit 141 in step S53 of FIG. 4 (step S73) and starts counting (step S74).

Subsequent to steps S72 and S74, the power supply control unit 143 determines whether the request for return from the low power consumption mode has been received from the request interpreting unit 142 (step S75). The return request is issued from the host device 20 and monitored by the request interpreting unit 142. When no return request has been received from the request interpreting unit 142 (No at step S75), it is determined whether a predetermined time has passed from the start of counting in the timer 144 (step S76). When the predetermined time has not passed yet (No at step S76), the process returns to step S75. When the predetermined time has passed (Yes at step S76), the power supply control unit 143 executes the transition processing to the second state (step S77), and the processing of the power supply control unit 143 and the timer 144 in the first state is ended.

The predetermined time to be measured by the timer 144 is determined based on, for example, the possible number of times the non-volatile memory 11 is rewritten, or an estimated number of times the memory system 10 would enter the low power consumption mode in the environment of use.

When the return request is received from the request interpreting unit 142 in step S75 (Yes at step S75), the power supply control unit 143 executes return processing from the low power consumption mode to the normal mode (step S78), whereby the processing of the power supply control unit 143 and the timer 144 in the first state is ended.

<Transition Processing from the First State to the Normal State>

Figure 6:
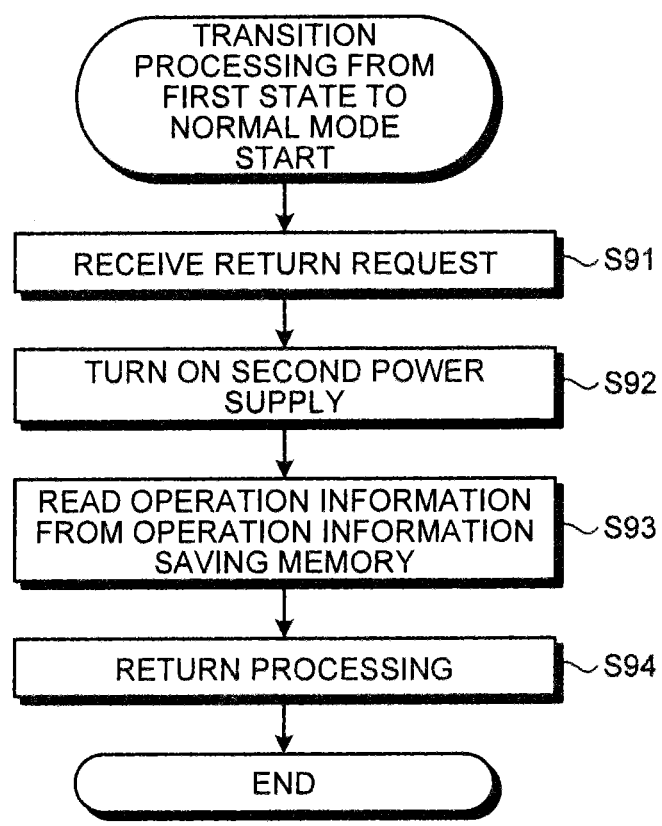
FIG. 6 is a flowchart illustrating an example of a transition processing procedure from the first state to the normal mode.

FIG. 6 is a flowchart illustrating an example of a transition processing procedure from the first state to the normal mode. In step S75 of FIG. 5, when the power supply control unit 143 receives, from the request interpreting unit 142, the request for return from the low power consumption mode (step S91), the second power supply 16 is turned on to place the memory control unit 141 in an operation state (step S92). Accordingly, the memory control unit 141 becomes operable.

After that, the memory control unit 141 reads the operation information from the operation information saving memory 13 (step S93), and executes return processing by storing the read operation information in the working memory 12 (step S94). Accordingly, the return processing is complete.

<Transition Processing from the First State to the Second State>

Figure 7:
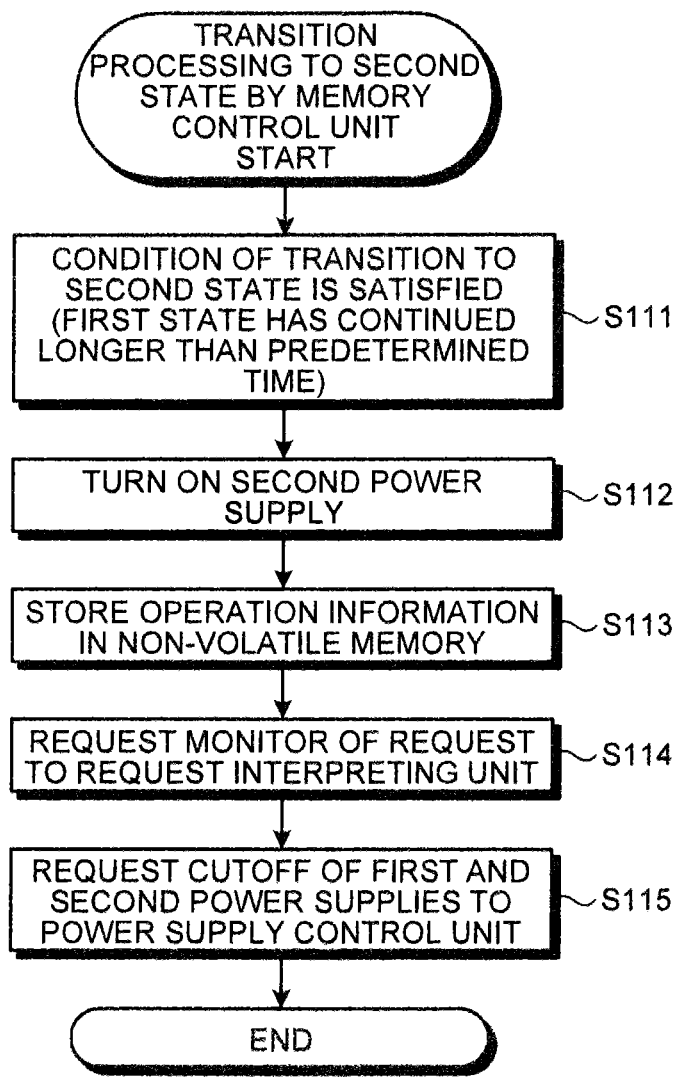
FIG. 7 is a flowchart illustrating an example of a transition processing procedure from the first state to a second state in the power supply control unit and the memory control unit.

FIG. 7 is a flowchart illustrating an example of a transition processing procedure from the first state to the second state in the power supply control unit and the memory control unit. When the condition of transition to the second state is satisfied or when the first state has continued longer than a predetermined time (step S111), the power supply control unit 143 turns on the second power supply 16 (step S112) to place the memory control unit 141 in the operation state. This is because the operation information saved in the operation information saving memory 13 cannot be stored in the non-volatile memory 11 without feeding power to the memory control unit 141. Thus, the power is fed to the memory control unit 141 during the processing.

The memory control unit 141 reads the operation information temporarily saved in the operation information saving memory 13 in step S52 of FIG. 4 and stores the read operation information in the non-volatile memory 11 (step S113). After that, the memory control unit 141 requests the request interpreting unit 142 to monitor the request for return from the low power consumption mode (step S114), while issuing the cutoff request to the power supply control unit 143 to cut off power feed to the first power supply 15 and the second power supply 16 (step S115). Thus, the transition processing to the second state is complete.

<Processing in the Second State>

Figure 8:
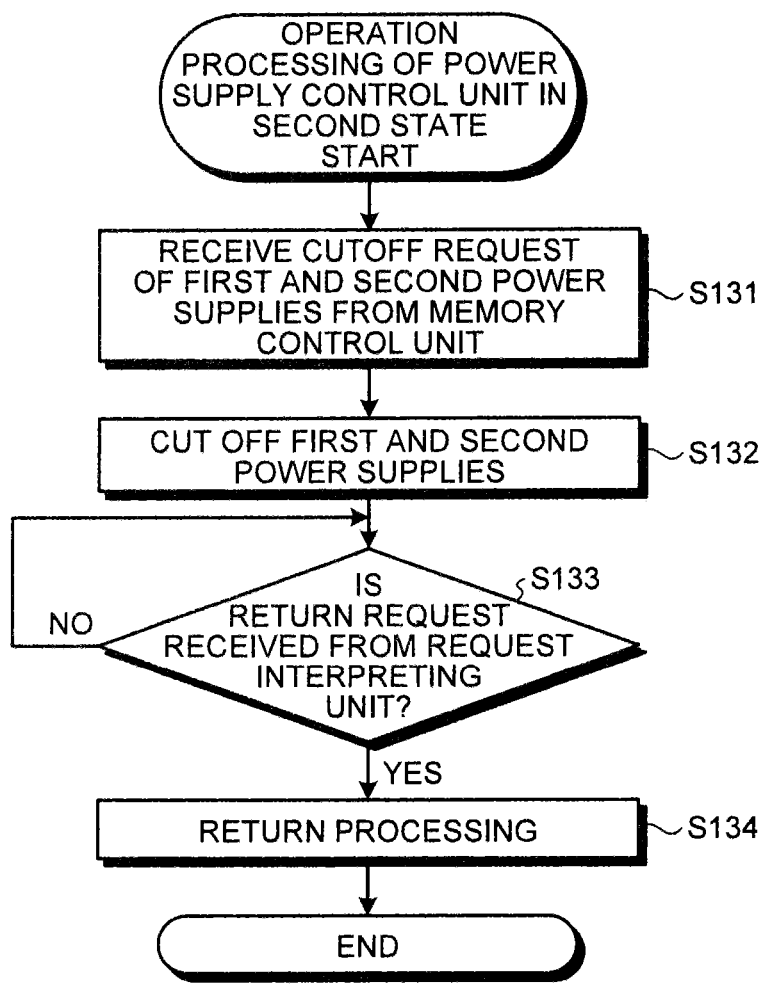
FIG. 8 is a flowchart illustrating an example of an operation processing procedure of the power supply control unit in the second state.

FIG. 8 is a flowchart illustrating an example of an operation processing procedure of the power supply control unit in the second state. When the requests to cut off the first and second power supplies 15 and 16 are received from the memory control unit 141 (step S131), the power supply control unit 143 cuts them off (step S132). Accordingly, the power feed to the memory control unit 141, the non-volatile memory 11, and the operation information saving memory 13 is cut off. After that, it is determined whether the request to cancel the low power consumption mode (the request to return to the normal mode) has been received from the request interpreting unit 142 (step S133). When no cancellation request of the low power consumption mode has been received (No at step S133), a wait state is entered until the cancellation request is received.

When the request to cancel the low power consumption mode has been received (Yes at step S133), the return processing to the normal mode is executed (step S134). Accordingly, the processing of the power supply control unit 143 in the second state is ended.

<Transition Processing from the Second State to the Normal Mode>

Figure 9:
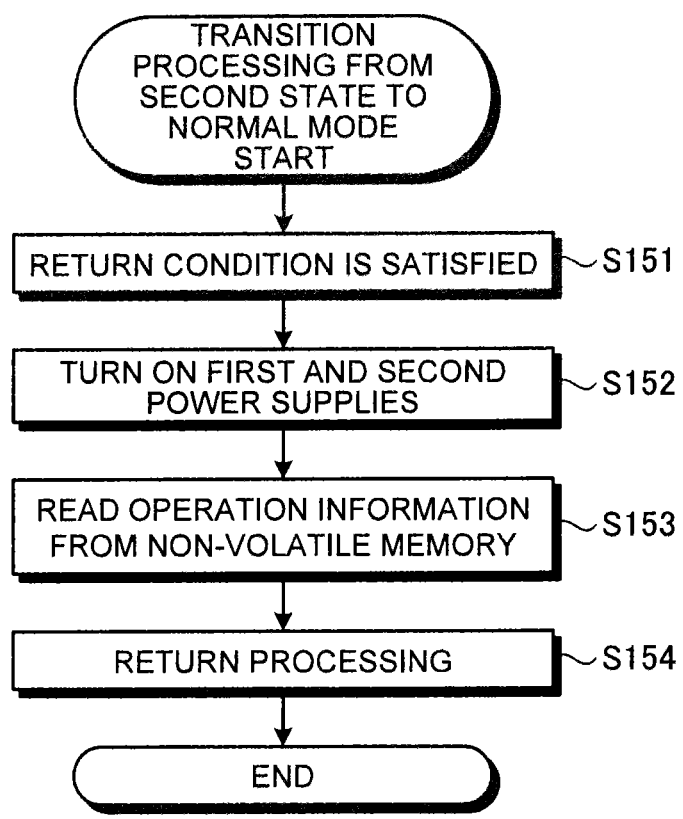
FIG. 9 is a flowchart illustrating an example of a transition processing procedure from the second state to the normal mode.

FIG. 9 is a flowchart illustrating an example of a transition processing procedure from the second state to the normal mode. When the condition of return to the normal mode is satisfied in FIG. 8 (step S151), that is, when the return request is received from the request interpreting unit 142, the power supply control unit 143 turns on the first and second power supplies 15 and 16 (step S152). Thus, power is fed to the memory control unit 141, the non-volatile memory 11, and the operation information saving memory 13.

The memory control unit 141 then reads the latest operation information from the non-volatile memory 11 (step S153), and stores the read operation information in the working memory 12 to execute the return processing (step S154). Accordingly, a transition to the normal mode is complete and the return processing from the second state is ended.

In the first embodiment, the first to third power supplies 15 to 17 are provided to feed power separately to a group including the request interpreting unit 142, the power supply control unit 143, and the timer 144, the memory control unit 141, and a group including the non-volatile memory 11, and the operation information saving memory 13. In addition, the first and second states are provided in the low power consumption mode. In the first state, when the request to enter the low power consumption mode is received, the operation information in the working memory 12 is temporarily saved in the operation information saving memory 13, and the second power supply 16 is turned off. In the second state, when the first state has continued longer than the predetermined time, the operation information having been saved in the operation information saving memory 13 is stored in the non-volatile memory 11 before the first and second power supplies 15 and 16 are turned off. In the first embodiment, therefore, after the request for transition to the low power consumption mode is issued, if the request for return to the normal mode is issued within the predetermined time, the return processing from the first state where the operation information has not been stored yet in the non-volatile memory 11 can be executed. Thus, in the method of the first embodiment, the power consumption can be decreased compared to that of the related art, the number of rewriting times of the non-volatile memory 11 having a limited number of rewriting times is decreased, and the lifetime of the non-volatile memory 11 can be extended.

After the condition of transition to the low power consumption mode is satisfied, the first state is maintained within the predetermined time, followed by entering the second state. As a result, the power feed to the operation information saving memory 13 formed by a volatile memory is not increased more than needed. Further, since the second power supply 16 has been turned off in the first state, the power consumption can be decreased compared to the normal mode.

Second Embodiment

There is a case where the memory system enters a short-cycled repeating loop of requests for transition to the low power consumption mode and requests for return therefrom after the initial startup or returning from the low power consumption mode. A memory system according to a second embodiment assumes the above case and will be described below.

The memory system 10 according to the second embodiment has a structure similar to that of the first embodiment illustrated in FIG. 1. The memory control unit 141, however, starts the timer 144 at the time of the initial startup or returning from the low power consumption mode. When the return request is received, the memory control unit 141 determines whether the memory system 10 should be placed in the first state or the second state of the low power consumption mode, depending on whether a predetermined time has passed. The memory control unit 141 executes the control according to the result of determination. Other constituent elements are similar to those described in the first embodiment, and the description thereof will not be repeated.

Figure 10:
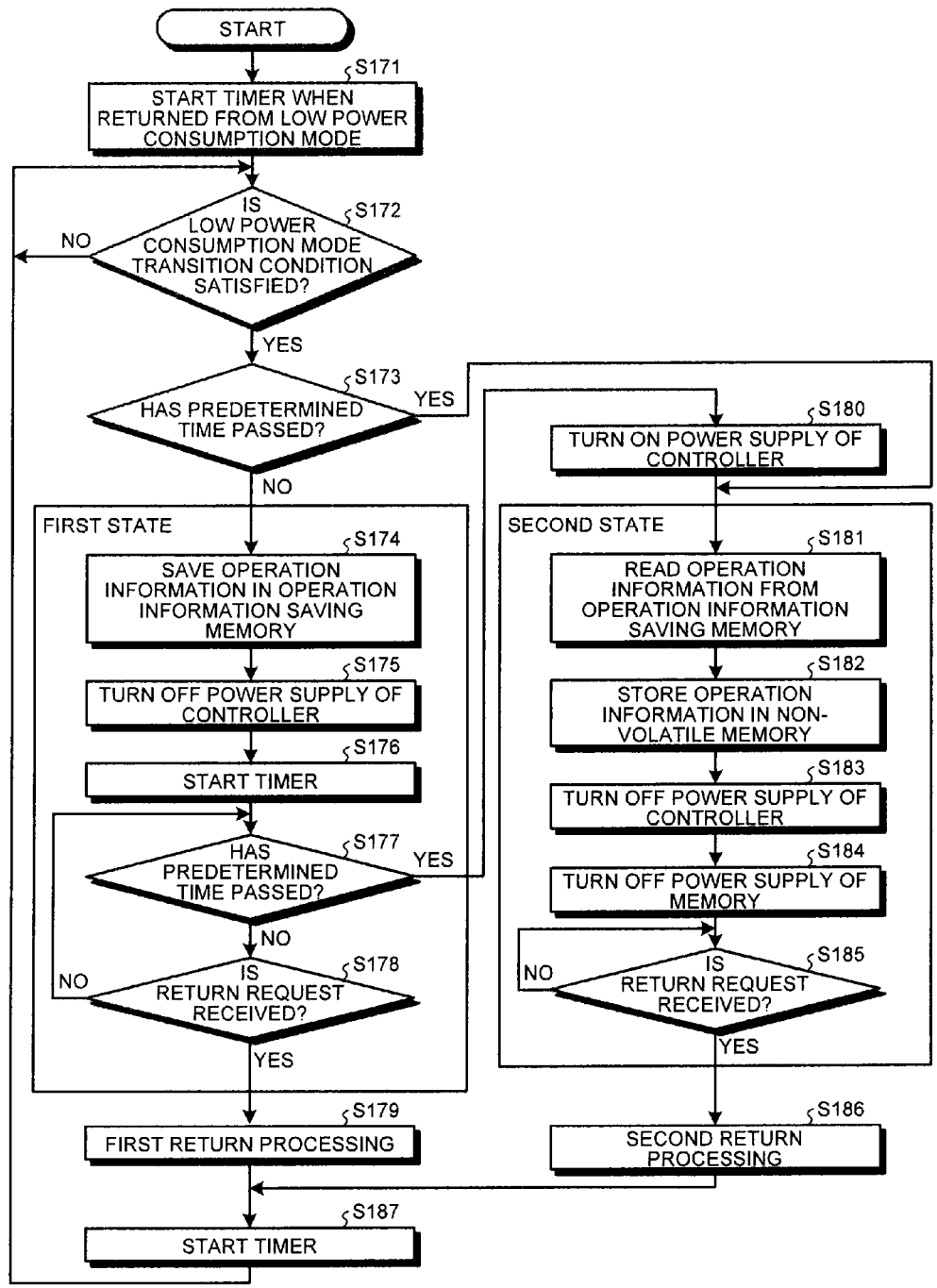
FIG. 10 is a flowchart illustrating an example of a processing procedure of power supply control in a memory system according to a second embodiment.

FIG. 10 is a flowchart illustrating an example of a processing procedure of the power supply control in the memory system according to the second embodiment. First, when the memory system 10 is initially started or receives a request for transition from the low power consumption mode to the normal mode, the memory control unit 141 starts the timer 144 in response to the transition to the normal mode (step S171). The length of time to be measured by the timer 144 may be, for example, longer (but not long enough to enter the second state when entering the loop) than the time needed between the return request and the transition request in the case where the memory system 10 enters a loop of repeating requests for transition to the low power consumption mode and requests for return to the normal mode.

After that, the memory control unit 141 determines whether the low power consumption mode transition condition is satisfied (step S172). When the low power consumption mode transition condition is not satisfied (No at step S172), a wait state is entered until the low power consumption mode transition condition is satisfied.

When the low power consumption mode transition condition is satisfied (Yes at step S172), it is determined whether a predetermined time has passed since the start of the timer 144 (step S173). If the predetermined time has not passed yet since the start of the timer 144 (No at step S173), the transition processing to the first state of the low power consumption mode is executed similarly to that described in steps S13 to S17 of FIG. 3 (steps S174 to S178).

At this time, if the return request is received from the host device 20 (Yes at step S178), first return processing from the low power consumption mode to the normal mode is executed (step S179). In the first return processing, as described in steps S18, S19, and S29 of FIG. 3, the power feed from the second power supply 16 to the controller 14 is turned on, and the operation information having been saved temporarily in the operation information saving memory 13 is read to the working memory 12. Accordingly, the use in the normal mode is started. After the first return processing, the memory control unit 141 starts the timer 144 (step S187), and the process returns to step S172.

In step S173, when the predetermined time has passed since the start of the timer 144 (Yes at step S173), the transition processing to the second state of the low power consumption mode is executed similarly to that described in steps S21 to S25 of FIG. 3 (steps S181 to S185).

In contrast, when the predetermined time has passed in the first state since the start of the timer 144 (Yes at step S177), or when the predetermined time has passed before the return request is received from the host device 20, the power feed from the second power supply 16 to the controller 14 is turned on (step S180) to enter the second state of the low power consumption mode (steps S181 to 185).

When the return request is received from the host device 20 in the second state (Yes at step S185), the second return processing from the low power consumption mode to the normal mode is executed (step S186). In the second return processing, as described in steps S26 to S29 of FIG. 3, the power feed from the first power supply 15 to the non-volatile memory 11 and the operation information saving memory 13 is turned on, the power feed from the second power supply 16 to the controller 14 is turned on, and the latest operation information saved in the non-volatile memory 11 is read to the working memory 12. Accordingly, the use in the normal mode is started. After the second return processing, the memory control unit 141 starts the timer 144 (step S187), and the process returns to step S172.

As described above, in the second embodiment, at the time of returning from the low power consumption mode or the initial startup, the timer 144 configured to measure the predetermined time is set. After that, when the low power consumption mode transition condition is satisfied, the state of the low power consumption mode is changed depending on whether the timer 144 has measured the predetermined time or more. Specifically, if the request for transition to the low power consumption mode is received before the predetermined time has passed, it is highly probable to receive the return request soon. Therefore, the first state in which the return processing can be executed immediately is entered. When the request for transition to the low power consumption mode is received after the predetermined time has passed, the second state is entered, as it is less probable to receive the return request thereafter. Therefore, in the case where the on-off switching of the low power consumption mode is repeatedly executed, the first state can be entered to prevent useless storage of the operation information in the non-volatile memory 11. Accordingly, the number of times the non-volatile memory 11 is rewritten can be decreased, to extend the lifetime of the non-volatile memory 11.

Third Embodiment

In the third embodiment, a method of switching the state to be entered of the low power consumption mode according to the state of the low power consumption mode at the time of receiving the request for return to the normal mode will be described.

Figure 11:
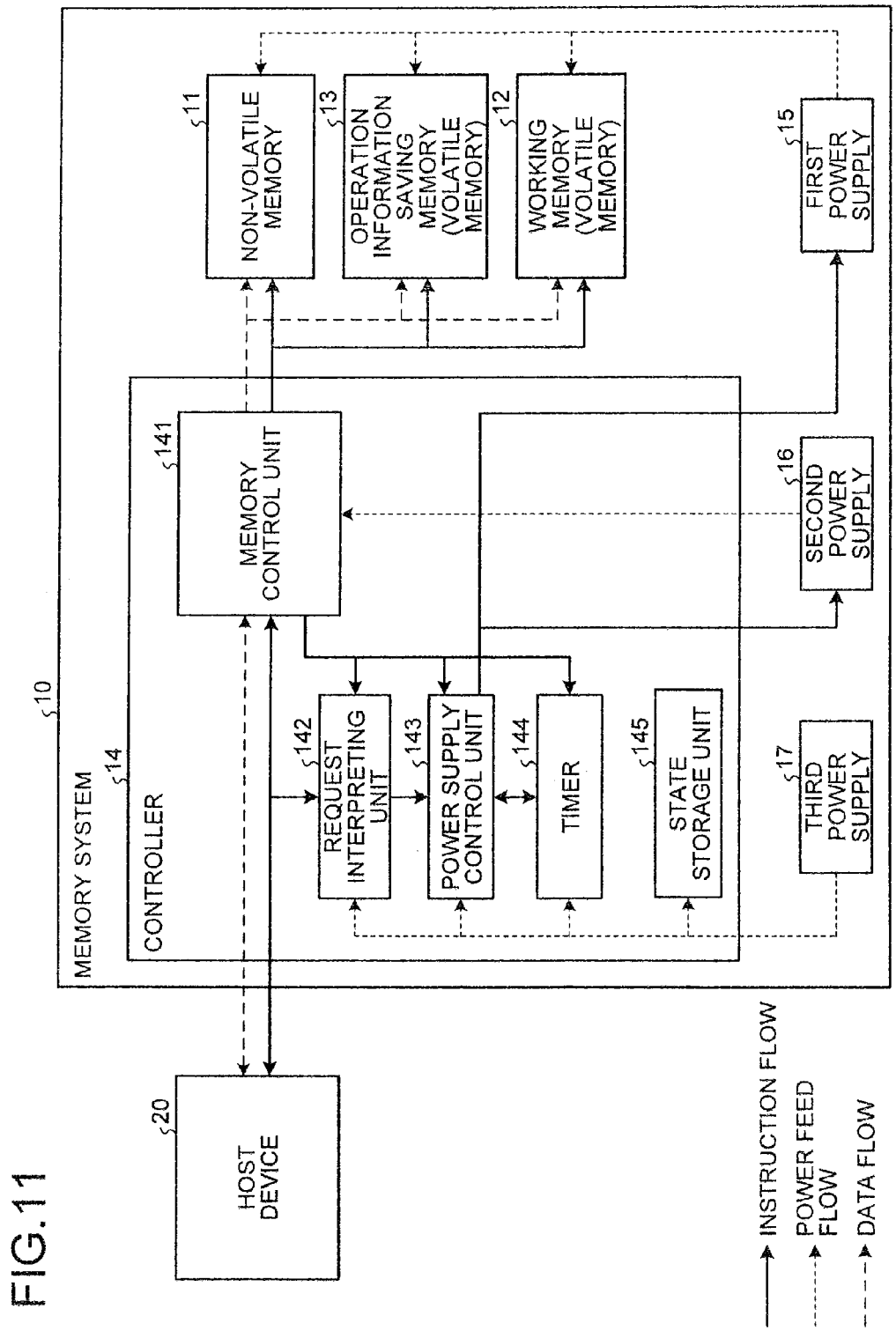
FIG. 11 is a schematic block diagram illustrating the structure of a memory system according to a third embodiment.

FIG. 11 is a schematic block diagram illustrating the structure of the memory system according to the third embodiment. Again, constituent elements of the structure necessary for explaining the embodiment are illustrated in the drawing. Also, the instruction flow is indicated by a solid line, the power feed flow is indicated by a dotted line, and the data flow is indicated by a broken line in the drawing.

The memory system 10 has a structure similar to that according to the first embodiment illustrated in FIG. 1, and further includes a state storage unit 145. The state storage unit 145 stores the final state of the last mode indicating the first state or the second state, when the transition to the low power consumption mode has been executed. The final state of the last mode is referenced when the mode is returned from the low power consumption mode to the normal mode.

When the condition of transition to the low power consumption mode is satisfied after the request for return to the normal mode is received from the host device 20, the memory control unit 141 switches the transition between two states according to the final state of the last low power consumption mode. Specifically, when the final state of the last low power consumption mode, that is, the final state of the last mode stored in the state storage unit 145 is the first state, the first state is entered. When the final state of the last mode is the second state and the low power consumption mode transition condition is satisfied before the predetermined time has passed since the last return processing, the first state is entered again. When the final state of the last mode is the second state and the low power consumption mode transition condition is satisfied with the predetermined time having passed since the last return processing, the second state is entered.

The constituent elements similar to those in the first and second embodiments are provided with the same reference signs, and the description thereof will not be repeated.

Figure 12:
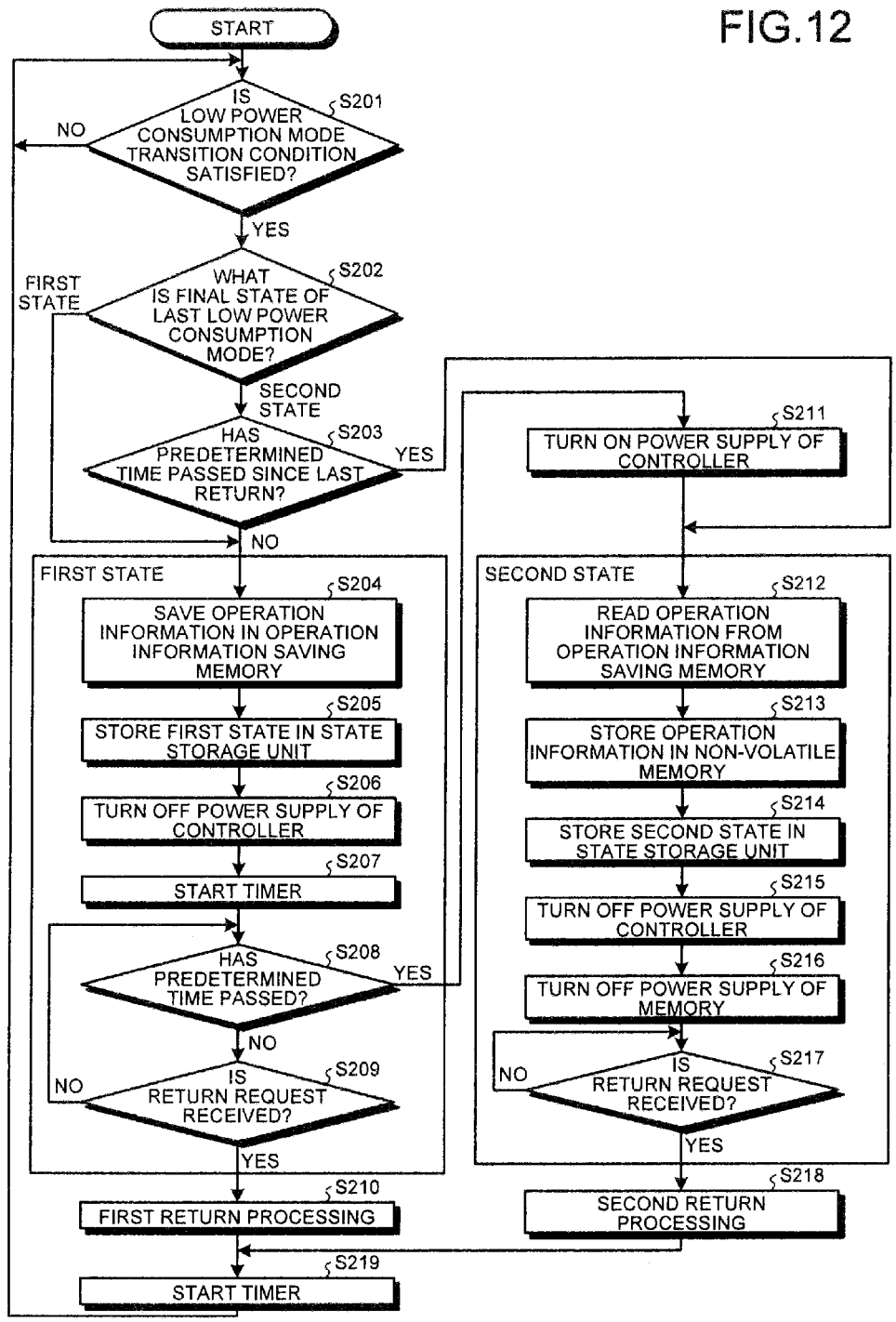
FIG. 12 is a flowchart illustrating an example of a processing procedure of power supply control of the memory system according to the third embodiment.

FIG. 12 is a flowchart illustrating an example of a processing procedure of power supply control of the memory system according to the third embodiment. First, it is assumed that the memory system 10 is in the normal mode, and that the timer 144 configured to measure a predetermined time during the return processing to the normal mode has been started.

In this state, the memory control unit 141 determines whether the low power consumption mode transition condition is satisfied (step S201). When the low power consumption mode transition condition has not been satisfied (No in step S201), the wait state is entered until the low power consumption mode transition condition is satisfied. When the low power consumption mode transition condition has been satisfied (Yes at step S201), the memory control unit 141 obtains, from the state storage unit 145, information as to whether the final state of the last low power consumption mode has been the first state or the second state (step S202).

In step S202, when the final state of the last mode has been the second state, it is determined whether the low power consumption mode transition condition has been satisfied after the predetermined time has passed from the last return (step S203). Since the timer 144 has already been started when the return processing to the last normal mode is executed, as described above, the determination can be done simply by reading the time of the timer 144. As described in the second embodiment, the predetermined time may be, for example, longer than the time between the return request and the transition request when the memory system 10 has entered a loop of repeating requests for transition to the low power consumption mode and requests for return to the normal mode (but not long enough to enter the second state when the loop is entered).

When the predetermined time has not passed from the last return (No at step S203), or the final state of the last mode in step S202 is the first state, the transition processing from the normal mode to the first state of the low power consumption mode is executed (steps S204 to S209). This transition processing to the first state is mostly similar to that described at steps S13 to S17 of FIG. 3, but the processing also includes processing (step S205) of storing the current state of the low power consumption mode, that is, the first state in the state storage unit 145 before the controller 14 is turned off.

When the return request is received from the host device 20 (Yes at step S209), the first return processing to the normal mode from the low power consumption mode is executed (step S210). In the first return processing, as described in steps S18, S19, and S29 of FIG. 3, the power feed from the second power supply 16 to the controller 14 is turned on, and the operation information having been saved temporarily in the operation information saving memory 13 is read to the working memory 12. Accordingly, the use in the normal mode is started. After the first return processing, the memory control unit 141 starts the timer 144 (step S219). The time measured by the timer 144 is used, when the low power consumption mode transition condition is satisfied, in determining whether the predetermined time has passed since the last return in step S203. Subsequently, the process returns to step S201.

In step S203, when the predetermined time has passed after the timer 144 is started (Yes at step S203), the transition processing to the second state of the low power consumption mode is executed (steps S212 to S217). This transition processing to the second state is mostly similar to that described at steps S21 to S25 of FIG. 3, but the processing also includes storing the current state of the low power consumption mode, that is, the second state in the state storage unit 145 before the controller 14 is turned off (step S214).

When the predetermined time has passed in the first state since the startup of the timer 144 (Yes at step S208), that is, when the predetermined time has passed before the return request is received from the host device 20, the power feed from the second power supply 16 to the controller 14 is turned on (step S211) to enter the second state of the low power consumption mode (steps S212 to S217).

When the return request is received from the host device 20 in the second state (Yes at step S217), the second return processing from the low power consumption mode to the normal mode is executed (step S218). In the second return processing, as described in steps S26 to S29 of FIG. 3, the power feed from the first power supply 15 to the non-volatile memory 11 and the operation information saving memory 13 is turned on, the power feed from the second power supply 16 to the controller 14 is turned on, and the latest operation information saved in the non-volatile memory 11 is read to the working memory 12. Thus, the use in the normal mode is started. After the second return processing, the memory control unit 141 starts the timer 144 (step S219), and the process returns to step S201.

As described above, in the third embodiment, every time the low power consumption mode is entered, the state of the mode is stored. After setting the timer 144 to measure the predetermined time in returning to the normal mode, the state corresponding to the final state of the last mode can be entered when the low power consumption mode transition condition is satisfied. Accordingly, if the entry and return to and from the low power consumption mode occur in a short time, it is determined that the system is placed in a short-cycled loop, and the operation information is temporarily saved in the operation information saving memory 13. Accordingly, the number of times the non-volatile memory 11 is rewritten can be decreased.

In the first to third embodiments above, two stages of state have been set in the low power consumption mode, but the embodiments are not limited thereto. For example, three or more stages of state may be provided in the low power consumption mode by dividing the memory control unit 141 into several regions and controlling each region by separate power supply. The state of the low power consumption mode may be further divided by providing separate power supplies for the non-volatile memory 11 and the operation information saving memory 13. By doing this, the power consumption can be controlled more finely.

Fourth Embodiment

The memory system described in the first to third embodiments above can be applied to electronic devices. In a fourth embodiment, the electronic devices having the memory systems of the first to third embodiments applied thereto will be described.

Figure 13:
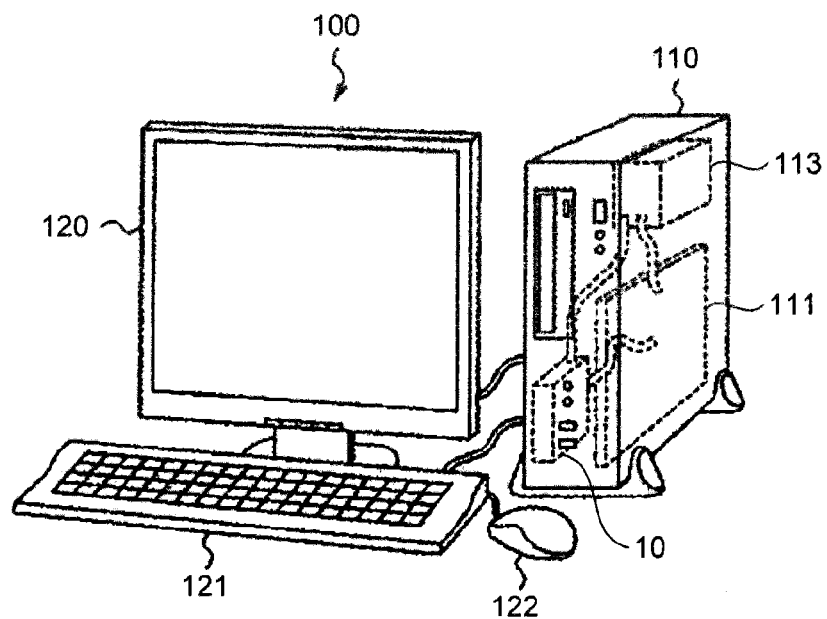
FIG. 13 is a schematic view illustrating a desktop-type personal computer as an electronic device.

FIG. 13 is a schematic view illustrating a desktop-type personal computer as an electronic device. A desktop-type personal computer 100 includes a body 110, a display 120, a keyboard 121, a mouse 122, etc. The body 110 includes a mother board 111, on which major hardware is installed, a memory system 10, a power supply device 113, etc. The memory system 10 is physically connected to the mother board 111 via a SATA cable, and further connected electrically to a CPU mounted on the mother board 111 via a southbridge mounted thereon. The power supply device 113 generates various types of power for use in the desktop-type personal computer 100, and supplies power to the mother board ill, the memory system 10, etc., via a power supply cable.

Figure 14:
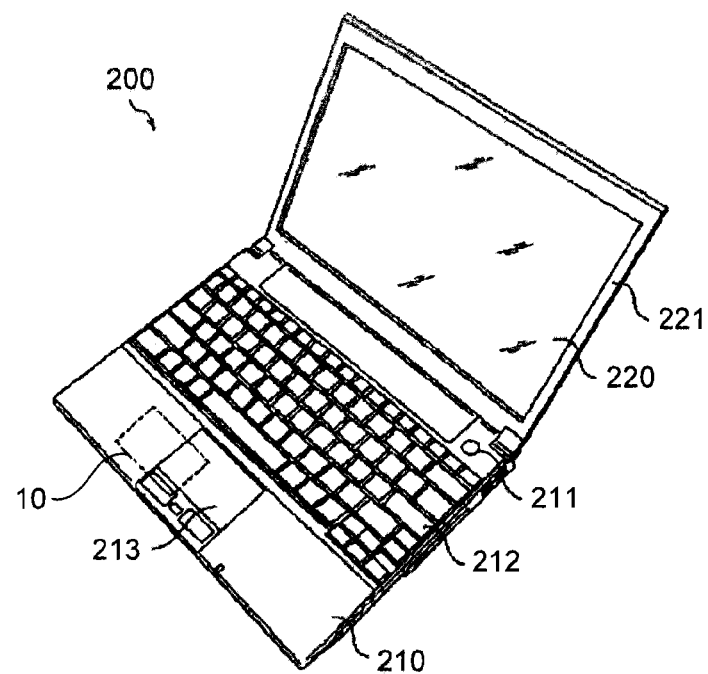
FIG. 14 is a schematic view illustrating a notebook-type personal computer as an electronic device.

FIG. 14 is a schematic view illustrating a notebook-type personal computer as an electronic device. A notebook-type personal computer 200 includes a body 210, a display unit 221, etc. The display unit 221 incorporates a display device 220 formed by, for example, a liquid crystal display (LCD). The display unit 221 is attached to the body 210 to be rotatable between an open position where the top surface of the body 210 is exposed and a close position where the display unit 221 covers the top surface of the body 210. The body 210 has a thin box-like housing, with a power supply switch 211, a keyboard 212, a touch pad 213, etc. arranged on the top surface thereof. Similar to the desktop-type personal computer 100, the body 210 also includes the memory system 10, a mother board, a power supply device, etc.

Figure 15:
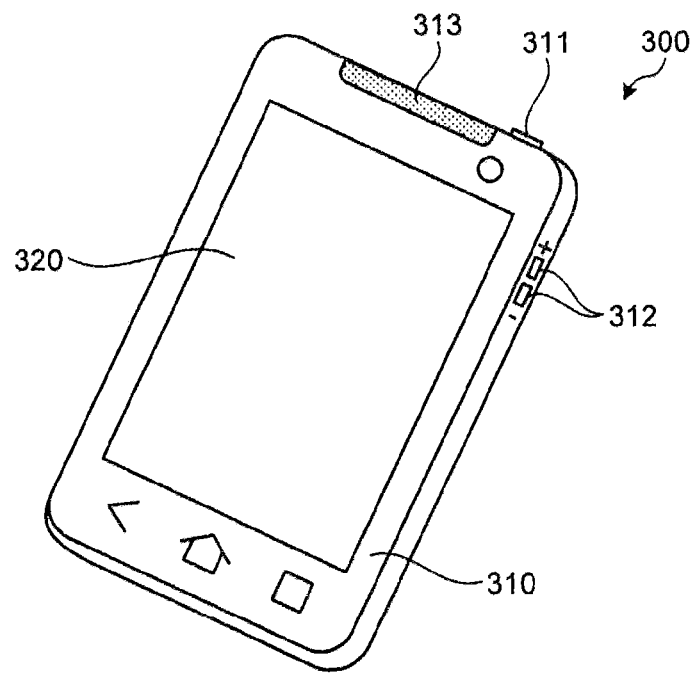
FIG. 15 is a perspective view illustrating the external appearance of a smart phone as an electronic device.

FIG. 15 is a perspective view illustrating an external appearance of a smart phone as an electronic device. A smart phone 300 includes a body 310 and a touch screen display 320.

The body 310 has a thin box-like housing. The touch screen display 320 incorporates an LCD and a touch panel. The touch panel is provided to cover the LCD screen. The touch screen display 320 is overlaid on the top surface of the body 310.

On the side of the body 310, a power button 311 configured to turn on/off the power supply of the smart phone 300, a volume control button 312, etc. are arranged. A speaker 313 and other constituent elements are arranged in the vicinity of the upper part of the top surface of the body 310. On one side of the body 310, a micro-universal serial bus (micro USB) connector, which is not illustrated, for use in connecting a USB cable or a USB device, for example, of the USB 2.0 standard is arranged.

Inside the body 310, there are provided a system on a chip (SoC), which is an integrated package of an application processor and various peripheral circuits, a main memory, a memory system, etc., although such elements are not illustrated. The SoC is connected to the main memory, the memory system, etc. via wiring.

Figure 16:
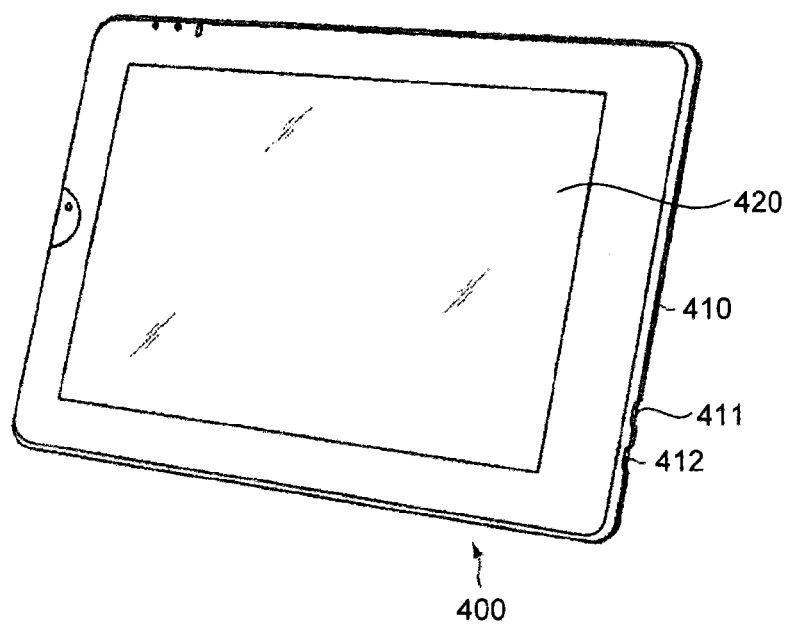
FIG. 16 is a perspective view illustrating the external appearance of a tablet-type terminal as an electronic device.

FIG. 16 is a perspective view illustrating an external appearance of a tablet-type terminal as an electronic device. The structure of a tablet terminal 400 is mostly similar to that of the smart phone 300 of FIG. 15, except for the size of a touch screen display 420. A typical size of the touch screen display 320 of the smart phone 300 is 5 inches or smaller, while the touch screen display 420 of the tablet terminal 400 is usually larger than 5 inches.

On the side of the body 410, there are provided a power button, a volume control button, a speaker, a memory card slot, a USB connector 411, an external display connecting terminal 412 compatible with a high-definition multimedia interface (HDMI) standard, etc. The external display connecting terminal 412 is provided for use in supplying an output of a digital video signal to an external display.

The internal structure of the body 410 is similar to that of the smart phone 300 of FIG. 15.

Although the desktop-type personal computer 100, the notebook-type personal computer 200, the smart phone 300, and the tablet terminal 400 have been described as examples of the electronic devices in the above description, the electronic devices are not limited to those devices and may include a PDA, an image capturing device such as a still camera or a video camera, a game console, and a car navigation system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system, comprising:
a non-volatile first storage unit;
a volatile second storage unit configured to store operation information used in control processing of the memory system;
a volatile third storage unit configured to temporarily save the operation information;
a controller including a first control unit and a second control unit, the first control unit being configured to control data exchange among the first storage unit, the second storage unit, and the third storage unit;
a first power supply configured to feed power to the first storage unit and the third storage unit; and
a second power supply configured to feed power to the first control unit in the controller, wherein
the second control unit is configured to control the first power supply and the second power supply,
the controller is configured to
make, when a condition of transition to a low power consumption mode is satisfied, the memory system enter a first state of the low power consumption mode, the first state being a state where the operation information in the second storage unit is temporarily saved in the third storage unit, while the first power supply is turned on and the second power supply is turned off, and
make, when a request for return is not received from a host device even after a predetermined time has passed since the transition to the first state, the memory system enter a second state of the low power consumption mode, the second state being a state where the operation information having been saved temporarily in the third storage unit is stored in the first storage unit, while both the first power supply and the second power supply are turned off.

2. The memory system according to claim 1, wherein the controller is configured to turn on the second power supply before the operation information having been saved temporarily in the third storage unit is stored in the first storage unit.

3. A memory system, comprising:
a non-volatile first storage unit;
a volatile second storage unit configured to store operation information used in control processing of the memory system;
a volatile third storage unit configured to temporarily save the operation information;
a memory control unit configured to control data exchange among the first storage unit, the second storage unit, and the third storage unit;
a first power supply configured to feed power to the first storage unit and the third storage unit;
a second power supply configured to feed power to the memory control unit;
a power supply control unit configured to control power saving of the first power supply and the second power supply; and
a third power supply configured to feed power to the power supply control unit, wherein
when a condition of transition to a low power consumption mode is satisfied, a first state is entered where the operation information in the second storage unit is temporarily saved in the third storage unit by the memory control unit, the first power supply is turned on by the power supply control unit, and the second power supply is turned off, and
when a request for return to the normal mode is not issued from a host device even after a predetermined time has passed since the transition to the first state, a second state is entered where the second power supply is turned on by the power supply control unit, the operation information in the third storage unit is stored in the first storage unit by the memory control unit, and the first power supply and the second power supply are turned off by the power supply control unit.

4. The memory system according to claim 3, wherein the third power supply is constantly turned on even when the low power consumption mode is entered.

5. The memory system according to claim 3, further comprising:
a request interpreting unit configured to interpret contents of a request received from the host device, wherein
the request interpreting unit notifies, upon receiving a request for transition to the low power consumption mode, the memory control unit of receipt of the request for transition, and
the memory control unit determines, upon receiving the notification, that the condition of transition to the low power consumption mode is satisfied.

6. The memory system according to claim 3, wherein
the memory control unit determines that the condition of transition to the low power consumption mode is satisfied when the memory system has entered an idle state.

7. The memory system according to claim 3, further comprising:
a request interpreting unit configured to interpret contents of a request received from the host device, wherein
the request interpreting unit notifies, upon receiving the request for return, the power supply control unit of receipt of the request for return,
the power supply control unit turns on the first power supply or the second power supply having been turned off, and
the memory control unit executes return processing to the normal mode.

8. The memory system according to claim 7, wherein
when the request for return is received in the first state, the power supply control unit turns on the second power supply, and
the memory control unit reads the operation information from the third storage unit and stores the read operation information in the second storage unit.

9. The memory system according to claim 7, wherein
when the request for return is received in the second state, the power supply control unit turns on the first power supply and the second power supply, and
the memory control unit reads the operation information from the first storage unit and stores the read operation information in the second storage unit.

10. The memory system according to claim 7, further comprising:
a timer configured to measure a predetermined time, wherein
the memory control unit executes transition from the normal mode to the first state, or from the normal mode to the second state, depending on whether the condition of transition to the low power consumption mode is satisfied by the time when the predetermined time has passed since the execution of the return processing.

11. The memory system according to claim 10, wherein
the memory control unit executes transition to the first state when the condition of transition to the low power consumption mode is not satisfied by the time when the predetermined time has passed since the execution of the return processing.

12. The memory system according to claim 10, wherein
the memory control unit executes transition to the second state when the condition of transition to the low power consumption mode is satisfied after the predetermined time has passed since the execution of the return processing.

13. The memory system according to claim 3, further comprising:
a timer configured to measure a predetermined time, wherein
the power supply control unit turns on, when no request for return is received by the time when the predetermined time has passed after turning off of the second power supply in the first state, the second power supply, and
the memory control unit executes transition processing from the first state to the second state.

14. The memory system according to claim 3, further comprising:
a state storage unit configured to store a state of the low power consumption mode when the low power consumption mode is entered, wherein
the memory control unit executes, when the condition of transition to the low power consumption mode is satisfied, transition to the first state or the second state according to contents stored in the state storage unit.

15. The memory system according to claim 14, wherein
the memory control unit executes, when the condition of transition to the low power consumption mode is satisfied, and the state stored in the state storage unit is the first state, transition to the first state.

16. The memory system according to claim 14, wherein
the memory control unit executes, when the condition of transition to the low power consumption mode is satisfied, and the state stored in the state storage unit is the second state, transition to the second state.

17. The memory system according to claim 14, further comprising a timer configured to measure a predetermined time, wherein
the memory control unit executes, when the condition of transition to the low power consumption mode is satisfied by the time when the predetermined time has passed since the execution of the return processing, transition from the normal mode to the first state.

18. The memory system according to claim 14, further comprising a timer configured to measure a predetermined time, wherein
the memory control unit executes, when the condition of transition to the low power consumption mode is satisfied after the predetermined time has passed since the execution of the return processing, transition from the normal mode to the second state.

19. The memory system according to claim 3, wherein
the first storage unit is a non-volatile memory with a limited number of rewriting times.

20. The memory system according to claim 3, wherein
the first storage unit is a NAND-type flash memory, and the second storage unit and the third storage unit are DRAMs or SRAMs.

* * * * *